June 25, 1935.  R. W. HURLBURT  2,006,272
MILKING MACHINE ATTACHMENT
Filed June 21, 1933   2 Sheets-Sheet 1
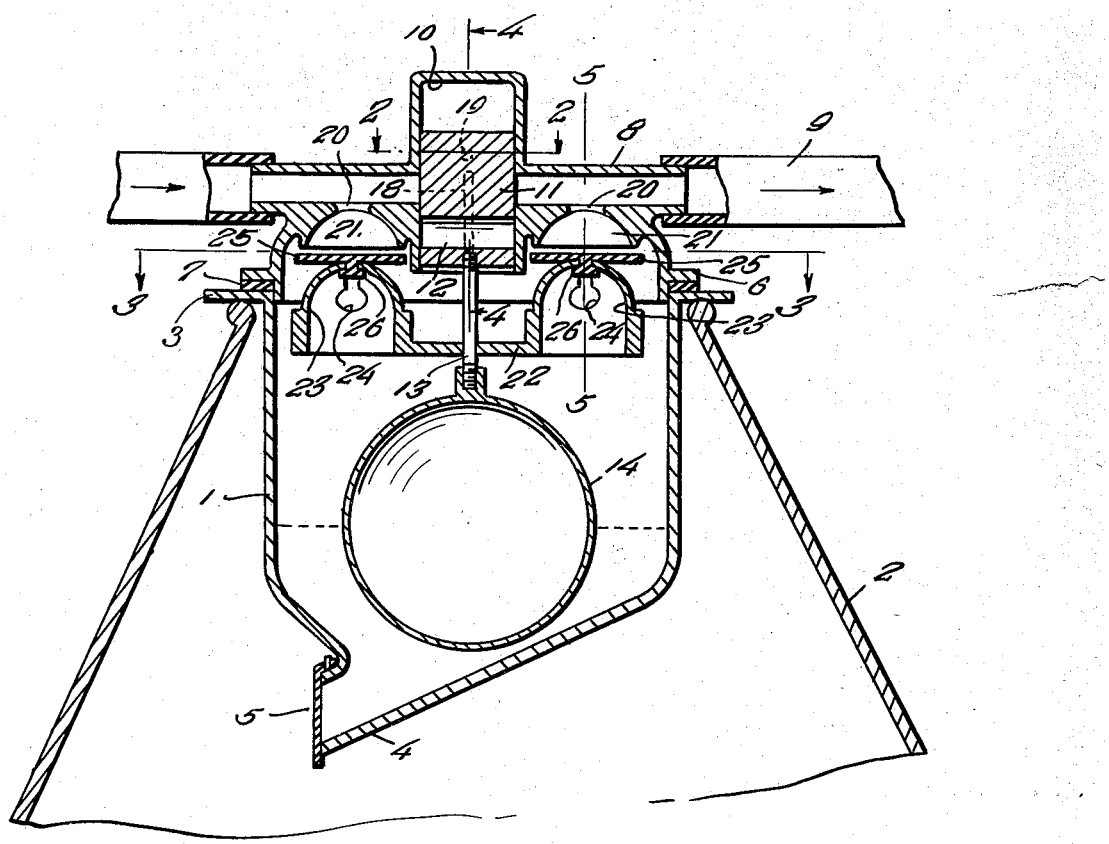
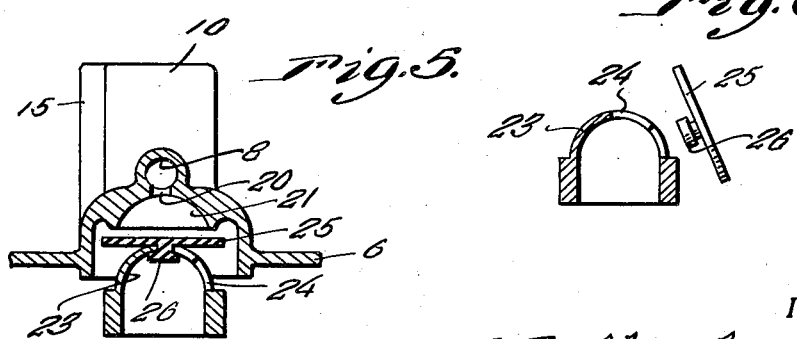
Inventor
R. W. Hurlburt
By Clarence A. O'Brien
Attorney

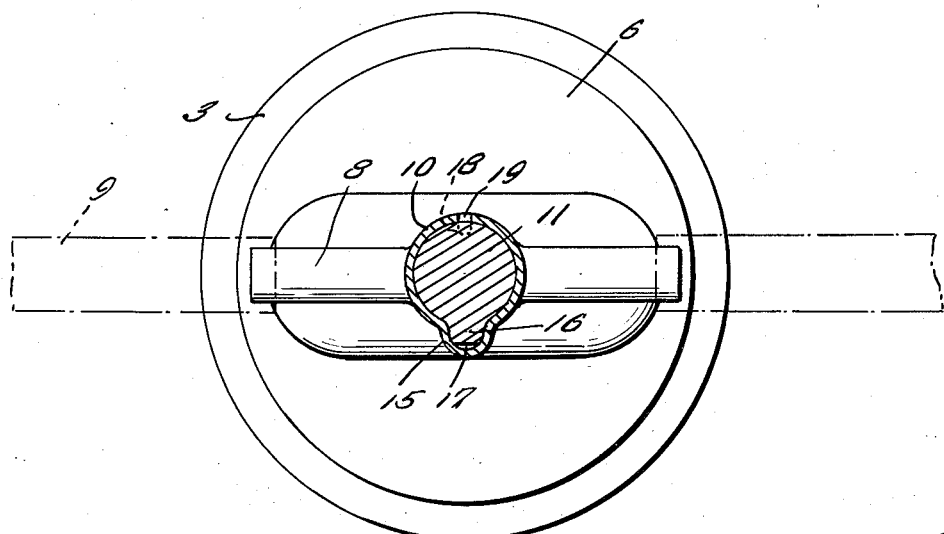
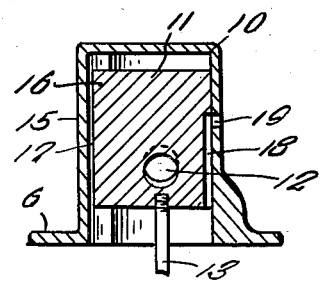
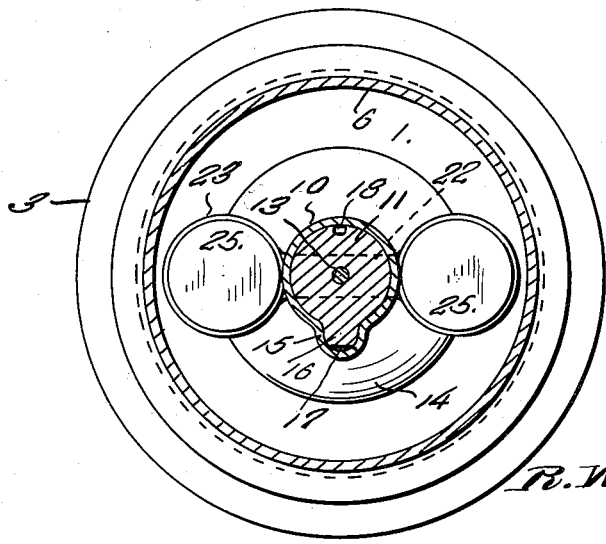

Patented June 25, 1935

2,006,272

UNITED STATES PATENT OFFICE 2,006,272

MILKING-MACHINE ATTACHMENT

Ralph Walter Hurlburt, Sheffield, Mass.

Application June 21, 1933, Serial No. 676,940

4 Claims. (Cl. 31—58)

The present invention pertains to attachments or accessories for milking machines of the suction type and has for its primary object to provide, in a manner as hereinafter set forth, a device of this character embodying a novel construction, combination and arrangement of parts through the medium of which a predetermined quantity of the first milk that is drawn from a cow which, as is well known, is usually comparatively poor and consequently undesirable, may be segregated or diverted.

Another important object of the invention is to provide an attachment or accessory of the aforementioned character embodying means whereby the stream of milk will automatically be caused to flow to the usual container constituting a part of the milking machine after a predetermined quantity has been segregated or diverted.

Other objects of the invention are to provide a milking machine attachment of the character described which will be simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in vertical section through an embodiment of the invention.

Figure 2 is a view in horizontal section, taken substantially on the line 2—2 of Figure 1.

Figure 3 is a horizontal sectional view, taken substantially on the line 3—3 of Figure 1.

Figure 4 is a detail view in vertical section, taken substantially on the line 4—4 of Figure 1.

Figure 5 is a vertical sectional view, taken substantially on the line 5—5 of Figure 1.

Figure 6 is a detail view in vertical section through one of the valves, showing the parts separated.

Referring now to the drawings in detail, it will be seen that the embodiment of the invention which has been illustrated comprises a container 1 which is removably suspended in the top of a receptacle 2 through the medium of a supporting flange 3. If desired, the container 1 may be removably secured to the receptacle 2 in any suitable manner. At its bottom, the container 1 is formed to provide a discharge spout 4 which is controlled by a flap valve 5.

The top of the container 1 is closed by a removable cover 6 which may be secured by any suitable means, a gasket 7 being provided between said cover and the container to assure an air-tight joint. Formed integrally with the cover 6 is a conduit 8 which is interposed in the suction tube 9 of the milking machine. The tube 9 is, of course, severed and the adjacent ends thereof connected in any suitable manner to the ends of the conduit 8.

The conduit 8 is intersected by a vertical cylinder 10 which is also integral with the cover 6. Operable in the cylinder 10 is a slidable valve 11 which controls the conduit 8, as will be apparent. The valve 11 includes a port 12 which is adapted to be brought into communication with the conduit 8. Depending from the valve 11 is a rod 13 on the lower end of which a float 14 is mounted, said float being operable in the container 1.

As illustrated to advantage in Figures 2 and 3 of the drawings, the cylinder 10 is formed to provide a vertical channel 15 which accommodates a vertical rib 16 on the valve 11, said rib 16 functioning to prevent rotation of the valve. The outer side of the rib 16 is substantially flat and spaced from the corresponding wall of the channel 15 in a manner to provide an air passage 17 to prevent the valve 11 from becoming air bound in the cylinder 10. In its opposite side, the valve 11 has formed vertically therein a channel 18 (see Figure 4) extending from its lower end to an intermediate point for communication with a vent port 19 in the cylinder 10 when the port 12 is brought into communication with the conduit 8.

The conduit 8 has formed therein, on opposite sides of the valve 11, ports 20 for communication with the container 1, said ports 20 merging with substantially concave valve seats 21. Fixed at an intermediate point on the rod 13 is a bar 22 which terminates, at its ends, in domes 23 having keyhole slots 24 therein, the small ends of said keyhole slots being located at the tops of the domes. Mounted on the domes 23 are valves 25 in the form of flexible rubber disks which are engageable with the seats 21 for controlling the ports 20 of the conduit 8. The valves 25 are removably secured in position on the domes 23 through the medium of integral headed shanks 26 engaged in the keyhole slots 24 in the manner suggested in Figure 6 of the drawings.

Briefly, the device functions in the following manner:—

When the container 1 is empty, the float 14 is in lowered position and, as seen in Figure 1 of the drawings, the conduit 8 is closed by the valve 11, said conduit communicating with the container 1 through the ports 20, the valves 25 being in open position. It will thus be seen that suction from the milking machine to the cow must be through the container 1 and consequently the first milk flowing through the tube 9 enters said container 1. This suction in the container 1 maintains the flap valve 5 in closed position. After a predetermined quantity of the milk has entered the container 1, the float 14, of course, rises. This brings the valves 25 into contact with the substantially concave seats 21 and the closing of the ports 20 by said valves 25 is then completed by the suction from the milking machine, thereby stopping the flow of milk to the container 1. As the valves 25 engage their seats, the port 12 in the valve 11 is brought into communication with the conduit 8 for opening said conduit 8 and the rest of the milk then flows from the cow through the suction tube 9 in the usual manner to the receptacle of the milking machine. By utilizing the suction from the milking machine for completing the closing of the valves 25, said valves are caused to seat very quickly after being brought into contact with the seats 21 by the float 14, as will be apparent. As will also be apparent, this construction and arrangement assures against leakage. It will further be seen that the conduit 8 is opened for the passage of the milk therethrough substantially simultaneously with or immediately after the closing of the valves 25. As the valve 11 is raised to open position, the channel 18 therein is brought into communication with the vent port 19 for breaking the vacuum in the container 1, thereby permitting the flap valve 5 to open for discharging the milk which has been collected in the container 1 into the receptacle 2. It has been found that the float 14 may be caused to drop, when no suction is in the tube 9 of the milking machine, by simply shaking the container 1 or the cover 6, thereby returning the valve 11 to closed position and the valves 25 to open position.

It is believed that the many advantages of a device constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. The combination with a milking machine including a suction line for drawing milk from a cow, of means interposed in said suction line for diverting a quantity of the milk, said means including a container communicating with the suction line for receiving the milk therefrom, interconnected valves controlling the suction line and the communication between said suction line and the container, and common means for actuating the valves.

2. The combination with a milking machine including a suction line for drawing milk from a cow, of means interposed in said suction line for diverting a quantity of the milk, said means including a container communicating with the suction line for receiving the milk therefrom, valve means controlling the communication between the container and suction line, valve means controlling said suction line, the first named valve means being open when the second named valve means is closed, and common means for actuating the first and second named valve means.

3. The combination with a milking machine including a suction line for drawing milk from a cow, of means interposed in said suction line for diverting a predetermined quantity of the milk, said means including a container communicating with the suction line for receiving the milk therefrom, interconnected valve means for controlling the communication between the container and the suction line and for controlling said suction line, the first named valve means being open when the second named valve means is closed, and a float operable in the container and connected with the valve means for actuating same.

4. The combination with a milking machine including a suction line for drawing milk from a cow, of means interposed in said suction line for diverting a quantity of the milk, said means including a container, a conduit on the container interposed in the suction line, said conduit communicating with the container, a valve controlling the conduit, a float connected to the valve and operable in the container, and valves connected with the first named valve for controlling the communication between the conduit and the container, the second named valves being open when the first named valve is closed.

RALPH WALTER HURLBURT